United States Patent Office 3,422,139
Patented Jan. 14, 1969

3,422,139
ACRYLAMIDO-N-GLYCOLIC ACID AND METHYLOL DERIVATIVE
Pierre Talet, Alfortville, Val-de-Marne, and Robert Behar, Paris, France, assignors to Nobel-Bozel, Paris, France, a joint-stock company of France
No Drawing. Filed June 8, 1965, Ser. No. 462,449
Claims priority, application France, June 9, 1964, 977,606
U.S. Cl. 260—534      2 Claims
Int. Cl. C07 *103/10;* D21h *3/12*

ABSTRACT OF THE DISCLOSURE

As new industrial products suitable for use in the finishing of paper and textiles in the preparation of herbicides, and in the manufacture of polymers as reticulation agents, acrylamido-N-glycolic acid and N-methylol-acrylamido-N-glycolic acid.

---

The present invention has for its object new compounds and more particularly new industrial products suitable for use in finishing operations for paper and textiles, in the preparation of herbicide compositions, in chemical syntheses, and also in the manufacture of high-polymers as reticulation agents or as co-polymerization co-monomers. The said new compounds according to the invention are $\alpha,\beta$-ethylene N-alkylol amides complying with the formula:

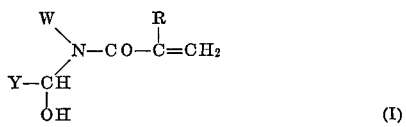

(I)

in which R is an atom of hydrogen or a methyl group;
Y is a group:

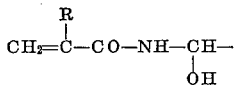

(in which R has the same meaning as above), or a group:

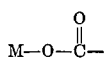

(in which M is an atom of hydrogen or an alkyl radical or an atom of metal such as potassium, sodium, etc.);
W is an atom of hydrogen or a group:

(in which R' is an atom of hydrogen or an alkyl radical).

The new compounds of the present invention thus comprise $\alpha,\beta$-ethylene N-mono-alkylol amides—in which W=H—and $\alpha,\beta$-ethylene N,N-dialkylol amides—in which

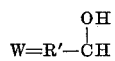

As examples and without any limitation, of new products more particularly contemplated by the present invention there may be cited:
Acrylamido-N-glycolic acid:

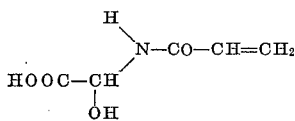

N-methylol-acrylamido-N-glycolic acid:

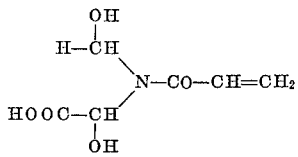

(Bis-acrylamido)-N,N'-ethylene-glycol N-monomethylol:

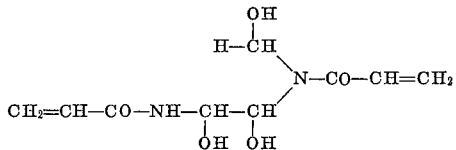

etc.

It has been found that the $\alpha,\beta$-ethylene N,N-dialkylol amides of the invention can be prepared from $\alpha,\beta$-ethylene N-monoalkylol amides.

The present invention also covers the method of preparation of the said N-monoalkylol compounds and their conversion to N,N-dialkylol compounds.

More particularly the said N,N-dialkylol amides can be prepared by condensing an $\alpha,\beta$-ethylene amide with an $\alpha$-carbonyl aldehyde and condensing product of the reaction with a simple aliphatic aldehyde.

As $\alpha,\beta$-ethylene amides, there may be employed acrylamide or methacryl amide.

The $\alpha$-carbonyl aldehydes to be employed in accordance with the invention are glyoxal or glyoxylic acid, substituted when so required.

As a simple aliphatic aldehyde, formaldehyde is preferably employed, but any other aliphatic aldehyde can be employed in principle, for example acetaldehyde, propionaldehyde, etc.

With glyoxal as the $\alpha$-carbonyl aldehyde, the manufacture is carried out in such manner that there is first symmetrical fixation of two molecules of $\alpha,\beta$-ethylene amide on one molecule of glyoxal, and that there is then fixation on the reaction product of one molecule of simple aliphatic aldehyde.

With glyoxylic acid or a glyoxylate, that is to say with an ester or salt of glyoxylic acid, the manufacture is carried out in such manner that there is first fixation of one molecule of $\alpha,\beta$-ethylene amide on one molecule of glyoxylic acid or of glyoxylate, and that there is then fixation on the product of the reaction, of one molecule of simple aliphatic aldehyde.

By choosing acrylamide for example as the $\alpha,\beta$-ethylene amide, and formaldehyde as the simple aliphatic aldehyde for example, there is obtained in the case of glyoxal, N-monomethylol - (bis - acrylamido) - N,N'-ethylene-glycol, and in the case of glyoxylic acid, the N-methylol-acrylamido-N-glycolic acid.

For the preparation of the new compounds according to the invention, glyoxal and glyoxylic acid can be utilized in any of their commercial forms, but it has been found of advantage to employ the two products in a state of high purity for example: glyoxal crystallized at 80% and glyoxylic acid crystallized at 80%.

For carrying the method into practice, there are dissolved in water, preferably in stoichiometric proportions, $\alpha$-carbonyl aldehyde and $\alpha,\beta$-ethylene together with a small proportion of anti-oxygen product in an amount of the order of 1% by weight of the $\alpha,\beta$-ethylene amide.

The solution obtained is adjusted to a pH value of 7 to 9 preferably 7.5 to 8, and is then subjected to agitation at low temperature, preferably of the order of 40° to 45° C., until the reaction is completed.

The anti-oxygen product is preferably of the class of hydroquinone and its derivatives.

There can be cited as anti-oxygen product giving excellent results. the monomethyl-ether of hydroquinone.

The product of the reaction is $\alpha,\beta$-ethylene N-monoalkylol amide of the invention, which can be employed as it is for industrial applications, or converted to the $\alpha,\beta$-ethylene N,N-dialkylol amide of the invention.

For the conversion to the N,N-dialkylol product, there is added a simple aliphatic aldehyde such as formaldehyde, in large excess with respect to the theoretical quantity necessary to form the N,N-dialkylol derivative, for example three molecules of formaldehyde per molecule of the primary condensation product; on the other hand, there is added a small quantity of a basic catalyst such as trisodium phosphate, for example in a proportion of the order of 1% by weight of the primary condensation product.

The solution obtained is adjusted to a pH value of 8 to 9, preferably about 8.5, and is then subjected to agitation at low temperature, preferably of the order of 55 to 65° C., until the reaction is completed. During the whole duration of the reaction, the pH value, which has a tendency to decrease, is kept at the value fixed, for example 8.5, by repeated addition of an alkali, for example sodium carbonate.

The final aqueous solution includes in solution the $\alpha,\beta$-ethylene N,N-dialkylol amide.

This solution can be applied, as it is or after dilution, in the finishing operations for paper and textiles. It is also possible to isolate the reaction product, in the solid state, by the usual means known per se, in order to apply it to chemical syntheses or to the manufacture of high-polymers as a cross-linking agent or as a co-polymerization co-monomer.

For the preparation of the $\alpha,\beta$-ethylene N,N-dialkylol amide, it is also possible to isolate intermediately the primary condensation product in the solid state. Conversely, the primary condensation and the alkylation can be carried out in a single operation, that is to say that before the primary condensation is completed, there can be added to the reaction medium, the simple aliphatic aldehyde, and then continue the operation up to the formation of the $\alpha,\beta$-ethylene N,N-dialkylol amide.

With regard to the primary condensation product, which is the $\alpha,\beta$-ethylene N-monolkylol amide according to the invention, this may for certain uses be applied directly without separating it from the reaction medium, for example for the preparation of herbicide compositions.

It is also possible to isolate the primary condensation product in the solid state by usual means, known per se, the $\alpha,\beta$-ethylene N-monolkylol amide isolated being applied for example as a solid constituent for herbicide compositions, as an agent for chemical syntheses, etc.

From the chemical aspect, the process of preparation of the $\alpha,\beta$-ethylene N-alkylol amides of the invention presents surprising and particular features, some of which have already been indicated. It is necessary to add that the method indicated permits the alkylation on the nitrogen of the N-mono-alkylol amides with the formation of N,N-dialkylol amides, and this could certainly not be foreseen. However, if the molecule of N,N-dialkylol amide according to the invention comprises a second amide group having also a free atom of hydrogen on the nitrogen, this second atom of nitrogen N' cannot be dialkylated, even by employing a very large excess of reactant, which is also a most suprising feature.

In order that the invention may be more clearly understood, a few examples are given below by way of illustration but not in any limitative sense. All the parts and all the percentages are by weight unless otherwise specified.

EXAMPLE 1

(Bis-acrylamido)-N,N'-ethylene-glycol

Into a vessel provided with a stirrer, there are introduced:

| | Parts |
|---|---|
| Crystallized 80% glyoxal (4 mols) | 290 |
| Water | 250 |

The mixture is heated and stirred to dissolve, while adding sodium bicarbonate by small portions in order to bring the pH value to 6.5. As soon as the solution is completed, there are introduced:

| | Parts |
|---|---|
| Acrylamide, 97.5% (8 mols) | 583 |
| Monomethyl-ether of hydroquinone | 6 |

The temperature is then brought to about 40° C. and sodium bicarbonate is added so as to bring the pH value between 7.5 and 8. The agitation is then continued, keeping the temperature at 40–45° C. and the pH value between 7.5 and 8, until the reaction no longer continues, which is the case after about 5 hours.

During the reaction, a precipitation is produced and at the end of the operation the contents of the reaction vessel forms a thick slurry.

After stopping the heating, the mixture is allowed to cool and is kept cold, at about 5° C. for a few hours. It is then drained in order to separate out the liquid. The remaining solid is dried under vacuum at 40° C.

There are thus obtained 773 parts of a crude dry product having the following characteristics:

| | |
|---|---|
| Melting point | 146° C. |
| Content of nitrogen | 13.8% (theory=14%). |
| Number of double bonds | 0.97 per 100 grams (theory=1). |
| Free CHO groups | None. |

By repeated re-crystallizations of the crude product in water-alcohol mixtures, there is obtained a pure product which is produced in the form of a white crystalline powder which complies with the following elementary analysis—Calculated: C, 48; H, 6; N, 14. Found: C, 48.05; H, 6.02; N, 14.09.

The crude product obtained is therefore the (bis-acrylamido)-N,N'-ethylene-glycol, in a state of purity of 97 to 98% (according to the nitrogen content and the number of double bonds); the efficiency of the operation in crude product at 97–98% of purity is 96.6%.

It should be noted that the crude product obtained is in practice more valuable than the pure product since it can be obtained directly with an excellent yield at a high degree of purity, which represents a very important feature in the economic field; furthermore, it is more suitable than the chemically pure product for practical applications, since it is definitely more soluble in solvents, especially in water while cold, and in solvents containing water.

As applications of this product, there may be indicated by way of example, in addition to those already mentioned above, its co-polymerization with vinyl acetate in the form of pearls, which results in polymers which are less attackable by solvents than the comparison products.

In the table below there are given the co-polymers containing from 0 to 1% of crude (bis-acrylamido)-N,N'-ethylene glycol (known as BAEG for purposes of simplicity) and their respective behaviour to solvents, noting that: 5=soluble in the cold state; 4=soluble when hot but not precipitating when cold; 3=soluble when hot, re-precipitating when cold; 1=swelling while hot.

| Proportion of BAEG (percent) | 0 | 0.2 | 0.5 | 1 |
|---|---|---|---|---|
| Behaviour to solvents: | | | | |
| Methanol | 5 | 4 | 4 | 1 |
| Benzene | 5 | 4 | 4 | 1 |
| Butyl acetate | 5 | 4 | 4 | 1 |
| Methyl-ethyl-ketone | 5 | 4 | 4 | 1 |

It can therefore be seen that reticulation with BAEG results in a substantial improvement in the behaviour to solvents, which is important for industrial applications, such as: coatings, varnishes, paints, various covering compositions.

In another series of tests, BAEG was co-polymerized up to proportions of 4% with vinyl acetate in a 40% emulsion. From these emulsions, plastified and non-plastified films were prepared, and the solubility characteristics of these films in the usual solvents were examined. All the films obtained showed a remarkable resistance to all the standard solvents: benzene, alcohols, acetates, ketones. In fact, while the control films are easily dissolved, the reticulated films simply show a slight swelling in hot solvent.

With other monomers than vinyl acetate, for example with the acrylic esters, the improvements found are similar.

EXAMPLES 2 TO 5

(Bis-acrylamido)-N,N'ethylene glycol

In the manufacture of BAEG in accordance with Example 1, different factors play a very important part, such as the presence of an anti-oxygen agent and the pH value. By way of demonstration, there will be given below the resutls of a series of tests in which a single factor has been changed each time with respect to the conditions of Example 1. In each case, the test was continued until the reaction no longer developed.

In Example No. 2, the monomethyl ether of hydroquinone (anti-oxygen) was replaced by hydroquinone; in tests Nos. 3, 4 and 5, the pH values were maintained respectively at 6.5–7; 9–9.5; 9.5–10.

The table below gives the results as regards the yields in crude product BAEG and the colorations:

| Ex. No. | Conditions | Yield, percent | Coloration |
|---|---|---|---|
| 2 | With hydroquinone | 82.5 | Definitely more coloured than (1). |
| 3 | At pH 6.5–7 | 10 | |
| 4 | At pH 9–9.5 | 22 | More coloured than (2). |
| 5 | At pH 9.5–10 | Nil | |
| (1) | | 96.6 | Almost white. |

In addition, the quality of the product of Examples 2, 3, 4 and 5 was inferior to that of Example 1; to mention only the product of Example 2, which was the best, the characteristics were:

Melting point _____ [1] 137° C.
Free CHO groups per 100 grams _____ [2] 0.2

[1] Against 146° C.
[2] Against 0.

EXAMPLE 6

N-methylol (bis-acrylamido)-N,N'-ethylene-glycol (MBAEG)

Into a vessel provided with an agitator, there are introduced:

Parts
The crude BAEG product at 97–98% of Example 1 (1.07 mols) _____ 220
Trisodium phosphate _____ 2.2
Aqueous formol at 39%, brought to pH 8.5 (3.44 mols) _____ 265

The mixture is heated to 60° C. with agitation, while keeping the pH value at 8.5 by repeated additions of sodium carbonate, first after half an hour and then every hour (the pH value has a tendency to fall to 6.2–6.5). The operation is stopped at the end of 4 hours.

After cooling, the slightly cloudy solution is filtered. There are thus obtained 480 parts of solution having 14.2% of free formaldehyde and comprising 0.44 double bond per 100 grams. In addition, a determination of nitrogen carried out on an aliquot part, after evaporation, indicates for this solution a nitrogen content of 6.16%.

This analysis shows that per molecule of BAEG employed, one molecule of formaldehyde was chemically fixed and that one molecule of the final condensation product obtained comprises two atoms of nitrogen and two double bonds.

The product obtained is therefore truly the N-monomethylol (bis-arcylamido)-N,N'-ethylene-glycol.

The solution obtained can be employed as it is or after dilution, in particular for the finishing treatments of papers and textiles. In fact, for this kind of application, the presence of free formol in the treatment baths is not troublesome. If so desired, it is also possible to free the solution beforehand from the free formol which it contains by the usual methods, known per se.

For certain applications, such as the carrying out of chemical syntheses, there may however be an advantage in isolating the reaction product, in the solid state, by the usual methods, known per se.

By way of example, there will be shown the application of the compound MBAEG to finishing treatments of textiles.

Use was made of the solution resulting from the above preparation, and therefore comprising 0.44 double bond per 100 grams, in order to give improved properties to a cellulose fabric, in particular a certain uncreasability, care being taken not to deteriorate the other qualities of the fabric. In fact, while it is relatively easy to obtain an uncreasability effect on a fabric, it is extremely difficult in practice to attain this object without adversely affecting the other properties of the fabric.

Three treatments were carried out:

Treatment I

The samples of fabric were impregnated with an aqueous solution containing per litre 50 grams of MBAEG solution and 10 grams of magnesium chloride (etherification catalyst), and then dried for 10 minutes at 90° C. The samples of fabric were then impregnated with an aqueous solution containing 10 grams per litre of ammonium persulphate (polymerization catalyst). The samples were then drained and dried for 5 minutes at 150° C.

Treatment II

Impregnation of the samples of fabric by an aqueous solution containing 50 grams per litre of MBAEG solution and 10 grams of magnesium chloride.
Drying for 10 minutes at 90° C.
Treatment in a bath of 2% NaOH for 3 minutes and then draining.
Treatment in a bath of 2% acetic acid for 3 minutes and then draining.
Rinsing with water containing 15 grams per litre of magnesium chloride.
Drying for 10 minutes at 90° C.

Treatment III

Impregnation of the samples of fabric with an aqueous solution containing 100 grams per litre of MBAEG solution.
Impregnation of the fabrics with a 7.5% solution of NaOH, without intermediate drying.
Rolling-up the fabric in a sheet of polyethylene for 40 minutes at 60° C.
Rinsing with water, neutralization by a bath of 5% acetic acid.
Rinsing with water and drying at 40° C.

The results of these treatments were entered in the table given below:

| Treatment | | | I | II | III | Untreated fabric sample |
|---|---|---|---|---|---|---|
| Resistance to bursting, kg./sq. cm | | | 7.47 | 7.34 | 8.38 | 6.8 |
| Dynamometric strength | Warp | | 39.4 | 41.5 | 41.8 | 47 |
|  | Weft | | 44.2 | 44 | 48 | 44 |
| Uncreasability index of the fabric treated | As it is | Warp | 129 | 120 | 128 | 93 |
|  |  | Weft | 133 | 124 | 131 | 90 |
|  | After 2 washings | Warp | 128 | 124 | 124 | 101 |
|  |  | Weft | 131 | 123 | 127 | 102 |
| Whiteness index of fabric treated | | | 80 | 80 | 77 | 80 |
| Chlorine retention index of fabric treated | | | 0 | 0 | 0 | 1 |
| Fabric treated with chlorine | Whiteness index | After ironing for 1 minute | 78 | 80 | 81 | 79 |
|  |  | After ironing for 2 minutes | 76 | 80 | 77 | 79 |
|  | Mullin index | After ironing for 1 minute | 8.36 | 8.03 | 8.27 | 7.9 |
| Chlorine |  | After ironing for 2 minutes | 7.26 | 8.67 | 9.26 | 8.3 |

It can be seen that the uncreasability index of the fabric is considerably improved by the treatments I, II and III. The other qualities of the fabric, instead of being deteriorated as is generally the case with the known finishing treatments, have rather undergone an improvement in all the tests, except for the dynamometric strength of the warp, which is slightly reduced.

Another valuable application for the methylol BAEG compound is its conversion to ether-oxide, for example with ethanol. The ethers obtained may be employed for example in the manufacture of butylated urea-formol, or melamine-formol resins; there are obtained polymers which are insoluble in all the usual solvents.

EXAMPLE 7

Acrylamido-N-glycolic acid

In a receptacle provided with an agitator, there are dissolved 280 parts of sodium carbonate in 400 parts of water, after which 370 parts (4 mols) of 80% glyoxylic acid are added in small portions. There are then added three parts of monomethyl-ether of hydroquinone and 291.5 parts (4 mols) of 98% acrylamide. The pH value is then about 8.5.

The mixture is then heated to 40–45° C. for 5 hours. After the reaction is completed, the product is acidified with 535 parts of concentrated hydrochloric acid (density=1.19) and the mixture is allowed to stand in the cold state (−8° C.).

In about 15 hours, an abundant crystallization is observed. The mixture is filtered and dried, which gives 424 parts of pure product.

The concentration of the filtrate enables a further 76 parts to be obtained, which makes a total of 500 parts of pure product.

According to the examinations carried out, the pure product obtained corresponds substantially to the formula of crystallized acrylamido-glycolic acid with 1 molecule of water $(CH_2=CH-CO-NH-CH-OH-COOH, H_2O)$ Its characteristics are actually as follows:

Found: Nitrogen content, 8.8%; number of double bonds per 100 grams, 0.61; number of COOH functions per 100 grams, 0.60. Calculated: Nitrogen content, 8.6%; number of double bonds per 100 grams, 0.613; number of COOH functions per 100 grams, 0.613.

The melting point of the product is 95° C. It is soluble in water, in alcohol and acetone at 40° C.; it is insoluble in chlorinated solvents and in non-polar solvents; it is only slightly soluble in the acrylic monomers.

It is a useful product, co-polymerizable with other monomers and giving the co-polymer acid functions in an original form.

In addition, in the form of salt or in the form of free acid, this product can be incorporated in herbicide compositions, in which it has a remarkable effect.

The said product can also be converted to an N-methylol compound, for example following the method indicated in Example 6, and can then be employed for the same applications as the product of Example 6.

We claim:
1. Acrylamido-N-glycolic acid.
2. N-methylol-acrylamido-N-glycolic acid.

References Cited

UNITED STATES PATENTS

| | | | |
|---|---|---|---|
| 2,574,114 | 11/1951 | Lehmann et al. | 8—116.3 |
| 3,185,539 | 5/1965 | Madison et al. | 8—116.3 |
| 3,262,985 | 7/1966 | Müller et al. | 260—80.3 |

JOSEPH L. SCHOFER, *Primary Examiner.*

S. M. LEVIN, *Assistant Examiner.*

U.S. Cl. X.R.

8—116.4; 71—113; 117—139.5, 152; 260—85.7